United States Patent
Tang et al.

(10) Patent No.: US 8,449,131 B2
(45) Date of Patent: May 28, 2013

(54) OPTICAL SIGHT

(75) Inventors: Chia-Chi Tang, Taichung (TW);
Chi-Shiuan Hsien, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 119 days.

(21) Appl. No.: 13/196,673

(22) Filed: Aug. 2, 2011

(65) Prior Publication Data
US 2012/0195023 A1 Aug. 2, 2012

(30) Foreign Application Priority Data

Jan. 31, 2011 (TW) .............................. 100103713 A

(51) Int. Cl.
*F21V 33/00* (2006.01)
*G02B 23/00* (2006.01)
(52) U.S. Cl.
USPC ............. 362/85; 362/268; 362/187; 359/425; 359/428; 359/429
(58) Field of Classification Search
USPC .............. 362/85, 268, 187; 359/425, 42, 428, 359/429
See application file for complete search history.

(56) References Cited

U.S. PATENT DOCUMENTS

| | | | | |
|---|---|---|---|---|
| 3,672,782 A * | 6/1972 | Akin, Jr. | ........................ | 356/251 |
| 5,065,520 A * | 11/1991 | Shimizu et al. | ................. | 42/123 |
| 5,452,131 A * | 9/1995 | Jorlov | ............................ | 359/638 |
| 6,005,711 A * | 12/1999 | Mai et al. | ....................... | 359/424 |
| 6,208,461 B1 * | 3/2001 | Gaber | ............................ | 359/399 |
| 6,868,615 B2 * | 3/2005 | Malley | ............................ | 33/297 |
| 7,375,881 B2 * | 5/2008 | Regan et al. | .................. | 359/431 |
| 7,913,440 B2 * | 3/2011 | Murg et al. | ..................... | 42/122 |
| 7,997,163 B2 * | 8/2011 | Casas | .............................. | 74/553 |
| 8,009,958 B1 * | 8/2011 | Schick et al. | ................. | 385/147 |
| 2002/0089742 A1 * | 7/2002 | Otteman | ....................... | 359/423 |

* cited by examiner

*Primary Examiner* — Ali Alavi
(74) *Attorney, Agent, or Firm* — Tracy M. Heims; Apex Juris, pllc

(57) ABSTRACT

An optical sight of the present invention may aim at an object via a cross. The optical sight has a focusing adjuster for focusing and a brightness adjuster for adjusting luminance on a cross. The focusing adjuster and the brightness adjuster are made at the same position that user may operate the optical sight more conveniently.

11 Claims, 6 Drawing Sheets

OPTICAL SIGHT

BACKGROUND OF THE INVENTION

1. Field of the Invention

The present invention relates generally to an optical device, and more particularly to an optical sight.

2. Description of the Related Art

FIG. 1 shows a conventional optical sight 100 including a barrel 110, on which a focusing adjuster 120 and a brightness adjuster 130 are provided, to provide a clearly view of an object when the user aims the optical sight 100 at the object.

However, the focusing adjuster 120 and the brightness adjuster 130 are provided at different positions of the barrel 110 that the user has to shift his/her hand between the focusing adjuster 120 and the brightness adjuster 130 for several times to operate them repeatedly before the user may get a clear view of the object through the optical sight 100. In aiming, the user looks at the optical sight 100 by one eye and keeps the other eye open to pay attention to other stuffs around. However, sometime, the optical sight 100 may block the view of the eye that the user could aware of the accident immediately when he/she is aiming through the optical sight 100.

In conclusion, the conventional optical sight 100 still has some drawbacks to be improved.

SUMMARY OF THE INVENTION

The primary objective of the present invention is to provide an optical sight, which has the focusing adjuster and the brightness adjuster at the same position.

According to the objective of the present invention, the present invention provides an optical sight including a barrel; a lens assembly received in the barrel; a lens with a cross received in the barrel; a light emitting device received in the barrel to emit light to the lens to light the cross up; a focusing adjuster, which is provided at the barrel, including a focusing knob rotating along a center of rotation to move at least a lens of the lens assembly along an optical axis for focusing when the focusing knob is turned; a brightness adjuster, which is provided at the barrel, including a brightness knob rotating along the center of rotation to change a luminance of the light emitting device when the brightness knob is turned; and a power source electrically connected to light emitting device through the brightness adjuster.

The present invention further provides an optical sight including a barrel; a lens assembly received in the barrel; a lens with a cross received in the barrel; a light emitting device received in the barrel to emit light to the lens to light the cross up; a focusing adjuster, which is provided at the barrel, including a focusing knob rotating along a first center of rotation to move at least a lens of the lens assembly along an optical axis for focusing when the focusing knob is turned; a brightness adjuster, which is provided at the barrel, including a brightness knob rotating along a second center of rotation to change a luminance of the light emitting device when the brightness knob is turned; and a power source electrically connected to light emitting device through the brightness adjuster.

DETAILED DESCRIPTION OF THE INVENTION

Figure 1:
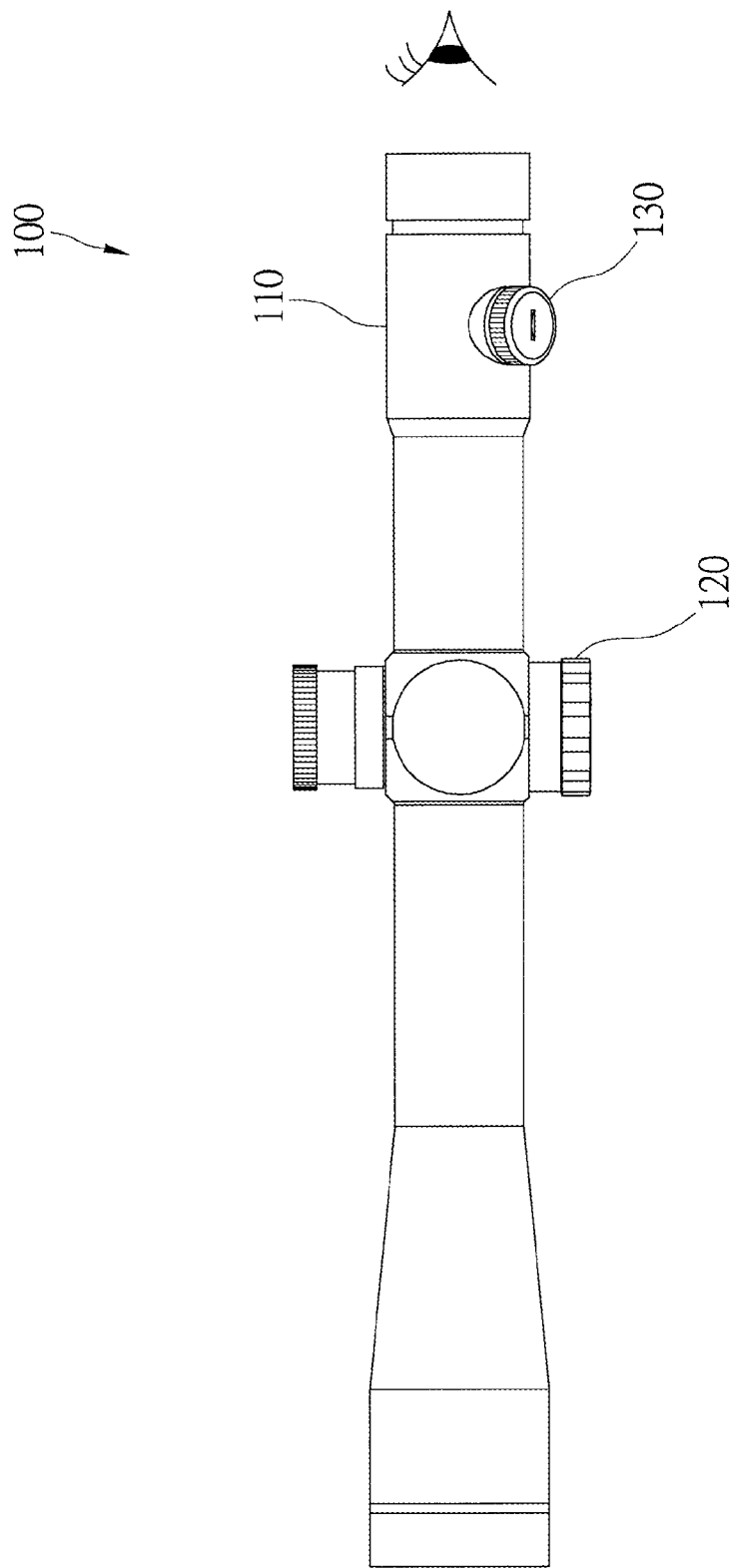
FIG. 1 is a perspective view of the conventional optical sight.
Figure 2:
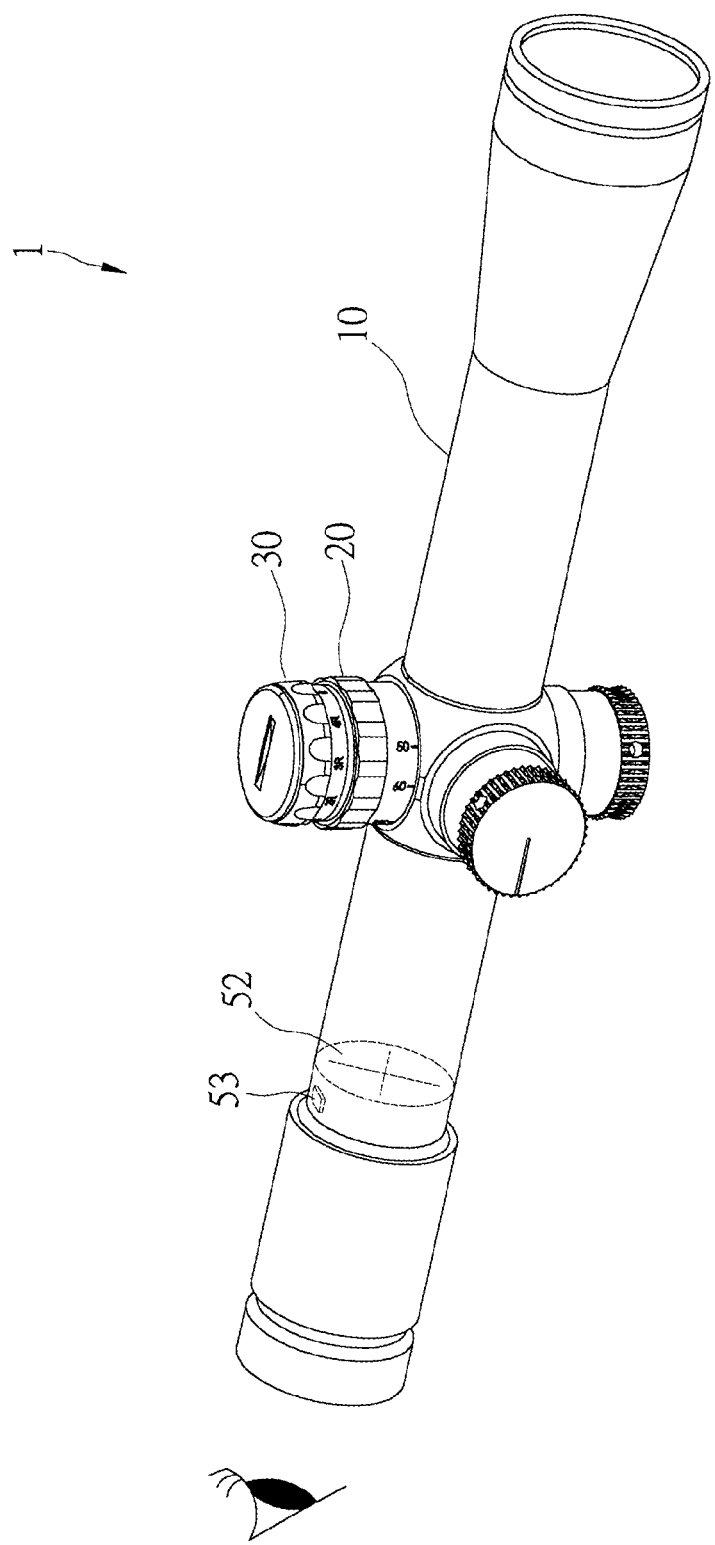
FIG. 2 is a perspective view of a first preferred embodiment of the present invention.
Figure 3:
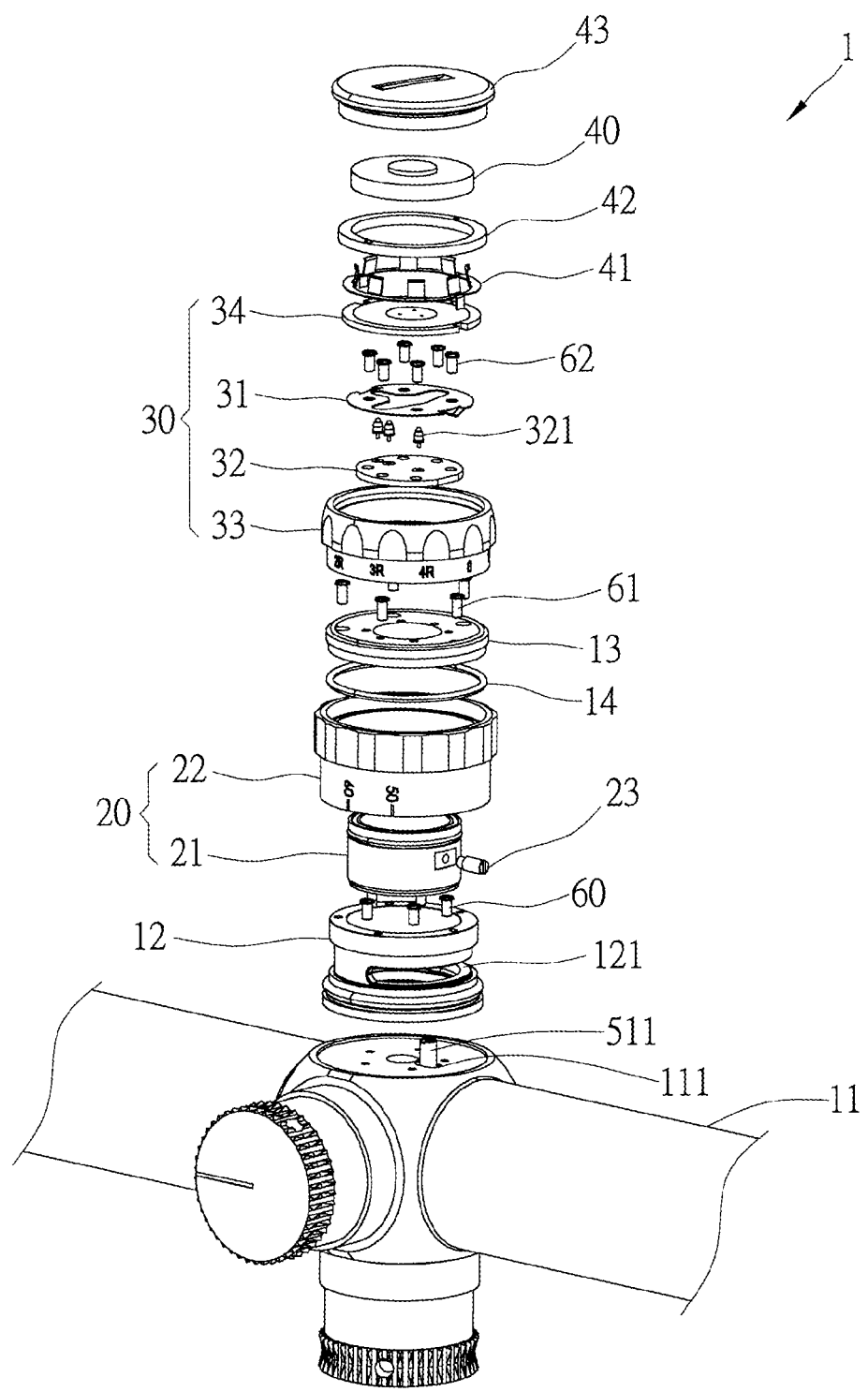
FIG. 3 is an exploded view of the first preferred embodiment of the present invention.
Figure 4:
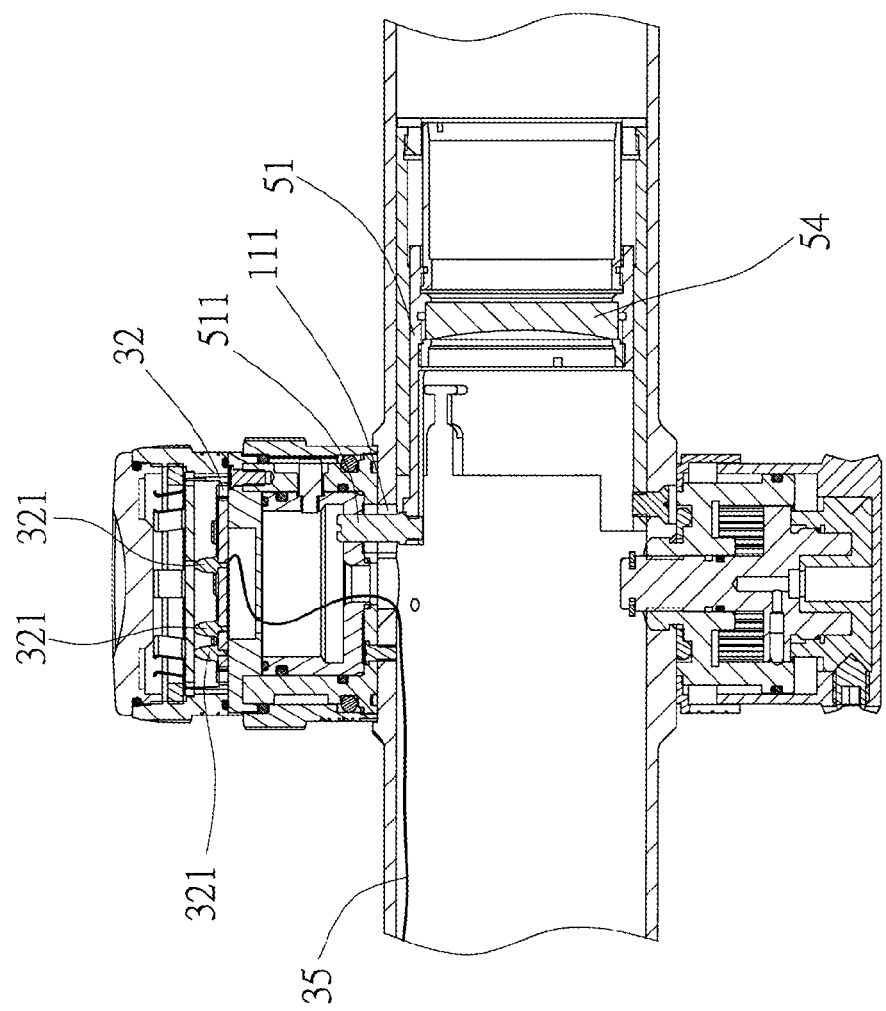
FIG. 4 is a sectional view of in part of the first preferred embodiment of the present invention.

As shown in FIG. 2 to FIG. 4, an optical sight 1 of the preferred embodiment of the present invention includes a barrel 10, a focusing adjuster 20, a brightness adjuster 30, and a power source 40.

The barrel 10 has a body 11, a first base 12, and a second base 13. The body 11 has an opening 111 thereon, and has a lens assembly, a frame 51, a lens 52 with a cross at a center thereof, and a light emitting device 53. The lens assembly includes a plurality of lenses 54 mounted on the frame 51. The frame 51 is provided with an axle 511 inserted into the opening 111. The light emitting device 53 is a LED in the present invention to light the cross of the lens 52 up.

The first base 12 is fixed to the body 11 by bolts 60. The axle 511 of the frame 51 is inserted into the first base 12 through the opening 111 of the body 11. The first base 12 further has a bore 121 on a sidewall thereof. The second base 13 is fixed to the first base 12 by bolts 61. An O ring 14 is provided between the first base 12 and the second base 13 to protect the second base 13.

Figure 5:
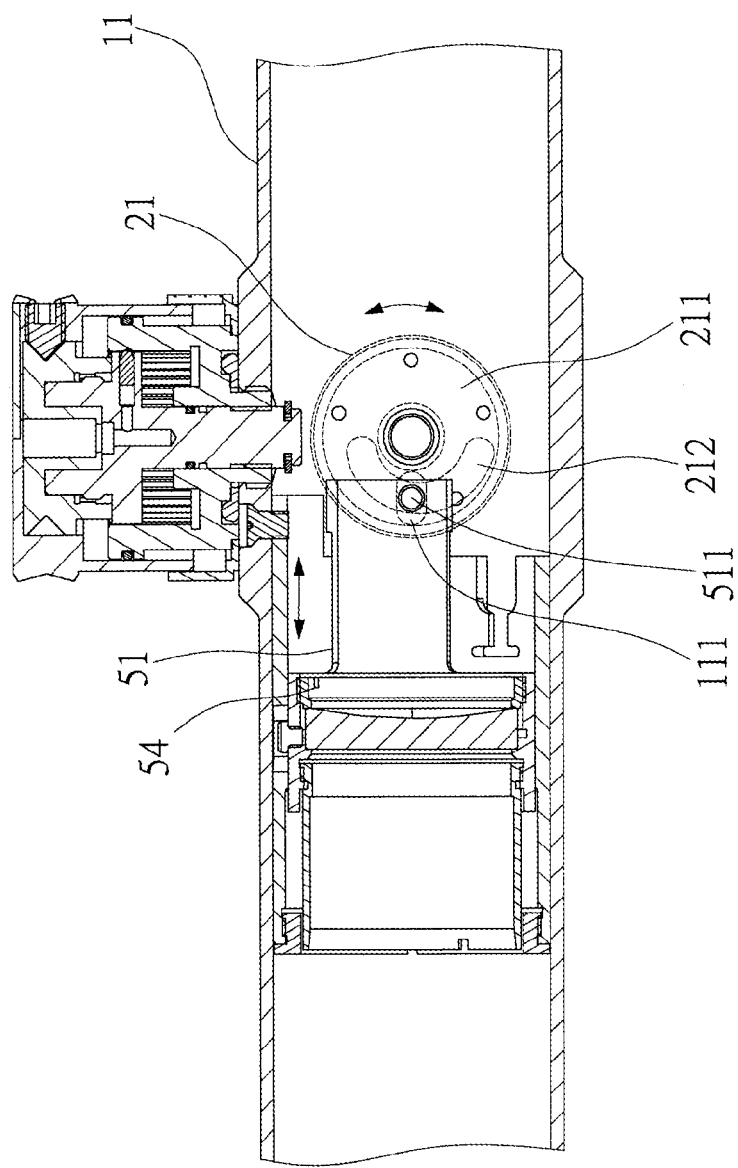
FIG. 5 is a sectional view of the first preferred embodiment of the present invention.

The focusing adjuster 20 includes a focusing cam 21, and a focusing knob 22. The focusing cam 21 is received in the first base 12. As shown in FIG. 5, the focusing cam 21 has a side 211 facing the body 11 and has a slot 212 on the side 211 to be engaged with the axle 511 of the frame 51. The slot 212 is curved and has an end proximal to a center of the side 211 and the other end distal to the center thereof. The focusing knob 22 is provided on an outer side of the first base 12 to be turned along an axle. The focusing knob 22 has a shaft 23 passing through the bore 121 of the first base 12 to connect the focusing cam 21 that the frame 51 may be moved by turning the knob 50 through the shaft 23 moves along the slot 212. The frame 51 carrying the lenses 54 is moved along an optical axis of the lenses 54 for focusing.

The brightness adjuster 30 includes a section elastic member 31, a main circuit board 31, a brightness knob 33, and a brightness control circuit board 34. The section elastic member 31 is provided on the main circuit board 32. The main circuit board 32 has three pads 321 to be connected to the light emitting device 53 through a flexible printed circuit board 35. The section elastic member 31 and the main circuit board 32 are fixed to the second base 13 by bolts 62. The brightness knob 33 is provided on an outer side of the second base 13. The brightness knob 33 and the focusing knob 22 are turned along the same shaft. The section elastic member 31 is engaged with an inner side of the brightness knob 33 that the section elastic member 31 may stop the brightness knob 33 at predetermined positions and sound clicks remind the user. The section elastic member 31 is a well known art, so we do not describe the detail here. The brightness control circuit board 34 is connected to the brightness knob 33 to be turned along with the brightness knob 33. The brightness control circuit board 34 has several different resistors electrically connected to the pads 321 respectively.

The power source 40 is a battery. An electrode plate 41, a ring 42, and a lid 43 are mounted on the brightness adjuster 30 to receive the battery 40 therein and connect the battery 40 to the brightness control circuit board 34 to provide power to the light emitting device 53.

User may turn the brightness knob 33 to turn the brightness control circuit board 34. It may change the resistance between the power source 40 and the light emitting device 53 through the pads contacting with different resistors to adjust the luminance of the light emitting device 53. It may provide several LEDs to emit different color lights to the lens 52. User may choose a suitable color light according to the background of the object that user may see the object more clearly through the optical sight 1 of the present invention.

Figure 6:
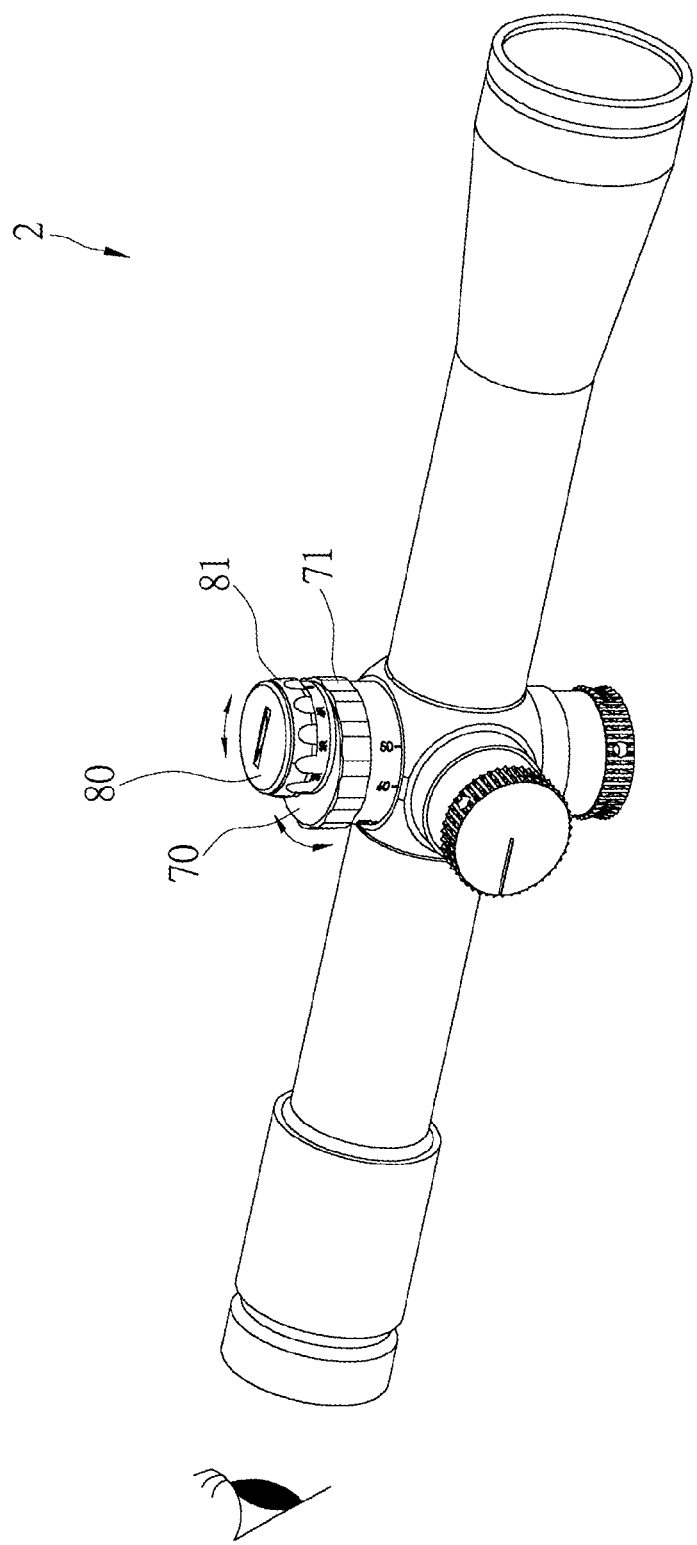
FIG. 6 is a perspective view of a second preferred embodiment of the present invention.

FIG. 6 shows an optical sight 2 of the second preferred embodiment of the present invention, which is similar to the first preferred embodiment, except that a focusing adjuster 70 has a focusing knob 71, which is turned along a first center of rotation, and a brightness adjuster 80 has a brightness knob 81, which is turned along a second center of rotation. The focusing knob 71 and the brightness knob 81 are independent that user may turn focusing knob 71 and the brightness knob 81 respectively to adjust the focusing and brightness.

An alternate design of the focusing adjuster and the brightness adjuster is that the brightness adjuster is more proximal to the body than the focusing adjuster.

Except for the circuit of the present invention for the brightness adjuster 30 to adjust the luminance thereof, it may provide a variable resistor to change the resistance to provide a stepless control of the luminance of the LED.

The first base 12 and the second base 13 may be made into a single element, and furthermore, the body 11, the first base 12 and the second base 13 may be made into a single element.

The description above is a few preferred embodiments of the present invention, and the equivalence of the present invention is still in the scope of claim construction of the present invention.

What is claimed is:

1. An optical sight, comprising:
   a barrel;
   a lens assembly received in the barrel;
   a lens with a cross received in the barrel;
   a light emitting device received in the barrel to emit light to the lens to light the cross up;
   a focusing adjuster, which is provided at the barrel, including a focusing knob rotating along a center of rotation to move at least a lens of the lens assembly along an optical axis for focusing when the focusing knob is turned;
   a brightness adjuster, which is provided at the barrel, including a brightness knob rotating along the center of rotation of the focusing knob to change a luminance of the light emitting device when the brightness knob is turned; and
   a power source electrically connected to light emitting device through the brightness adjuster.

2. The optical sight as defined in claim 1, wherein the barrel has a body and a base fixed to the body, and the focusing adjuster and the brightness adjuster are provided at the base.

3. The optical sight as defined in claim 2, wherein the focusing adjuster is more proximal to the body than the brightness adjuster.

4. The optical sight as defined in claim 3, wherein the barrel has a body, a first base provided on the body, and a second base provided on the first base, and the focusing adjuster is provided on the first base, and the brightness adjuster is provided on the second base.

5. The optical sight as defined in claim 4, further comprising a frame, on which the lens assembly is mounted, wherein the frame has an axle inserted into an opening of the first base, and the focusing adjuster further has a focusing cam pivoted on the barrel to be turned along with the focusing knob, and the focusing cam has a slot to be engaged with the axle of the frame that the focusing cam moves the frame along the optical axis when the focusing is turned.

6. The optical sight as defined in claim 1, wherein the brightness adjuster includes a main circuit board fixed to the barrel and having at least a pad to be electrically connected to the light emitting device and a brightness control circuit board connected to the brightness knob to be turned along with the brightness knob, wherein the brightness control circuit board has a plurality of resistors with different resistances to contact the pads when the brightness knob is turned.

7. An optical sight, comprising:
   a barrel having at least a base;
   a lens assembly received in the barrel;
   a lens with a cross received in the barrel;
   a light emitting device received in the barrel to emit light to the lens to light the cross up;
   a focusing adjuster, which is provided at the base of the barrel, including a focusing knob rotating along a first center of rotation to move at least a lens of the lens assembly along an optical axis for focusing when the focusing knob is turned;
   a brightness adjuster, which is provided at the base of the barrel, including a brightness knob rotating along a second center of rotation to change a luminance of the light emitting device when the brightness knob is turned; and
   a power source electrically connected to light emitting device through the brightness adjuster.

8. The optical sight as defined in claim 7, wherein the barrel has a body, a first base provided on the body, and a second base provided on the first base, and the focusing adjuster is provided on the first base, and the brightness adjuster is provided on the second base.

9. The optical sight as defined in claim 7, wherein the first center of rotation and the second center of rotation are located at the same line.

10. The optical sight as defined in claim 7, further comprising a frame, on which the lens assembly is mounted, wherein the frame has an axle inserted into an opening of the first base, and the focusing adjuster further has a focusing cam pivoted on the barrel to be turned along with the focusing knob, and the focusing cam has a slot to be engaged with the axle of the frame that the focusing cam moves the frame along the optical axis when the focusing is turned.

11. The optical sight as defined in claim 7, wherein the brightness adjuster includes a main circuit board fixed to the barrel and having at least a pad to be electrically connected to the light emitting device and a brightness control circuit board connected to the brightness knob to be turned along with the brightness knob, wherein the brightness control circuit board has a plurality of resistors with different resistances to contact the pads when the brightness knob is turned.

\* \* \* \* \*